Oct. 27, 1959 E. R. PRICE ET AL 2,910,325
AUTOMATIC BRAKING SYSTEM
Filed Oct. 1, 1956 2 Sheets-Sheet 2

INVENTORS
EARL R. PRICE
RICHARD H. LONG
BY *William I. Hickey*
ATTORNEY

United States Patent Office 2,910,325
Patented Oct. 27, 1959

2,910,325

AUTOMATIC BRAKING SYSTEM

Earl R. Price and Richard H. Long, South Bend, Ind., assignors to Bendix Aviation Corporation, South Bend, Ind., a corporation of Delaware Application October 1, 1956, Serial No. 613,127

4 Claims. (Cl. 303—30)

The present invention relates to pneumatic actuating systems; and more particularly to vacuum actuated automotive braking systems and the like.

In one type of braking system used in tractor-trailer truck combinations, vacuum from a reservoir positioned on the trailer is communicated by means of a remote control valve, also positioned on the trailer, to a normally atmospheric suspended brake applying fluid pressure motor operating the brakes of the trailer. The trailer control valve is operated by means of a control fluid pressure motor having opposed chambers. One of these chambers is supplied with vacuum from a service vacuum line leading from the tractor, and supplying the reservoir; and the other of these chambers is normally supplied with vacuum by means of a control line also leading from the tractor. The fluid pressure motor is so arranged as to release the trailer's brakes whenever vacuum of substantially equal intensity exists in both the service and control lines; and is arranged so as to actuate the trailer's brakes when atmosphere is bled into the control line. Controls on the tractor normally communicate both lines with the same vacuum source to release the trailer brakes. These same controls isolate the two lines and admit air to the control line to actuate the trailer's brakes. The advantage of such a system is that rupture of the control line (as for example when the trailer becomes separated from the tractor) automatically applies the trailer's brakes. One disadvantage found in such systems is that slow leaks in either the control or service vacuum lines during the released condition of the trailer's brakes gradually raise the pressure in both of the opposed chambers of the control fluid pressure motor to such an extent that a complete trailer brake application can no longer be made.

An object of the present invention is the provision of a new and improved braking system of the general type discussed above having means which permits both sides of the remote control fluid pressure motor to be connected to the service and control lines respectively during non-braking conditions of the trailer brakes; but which suspends the service vacuum side of the remote control motor with an auxiliary vacuum supply each time the trailer's brakes are applied, thereby assuring that sufficient pressure differential is available for said remote control motor to completely actuate the trailer's brakes.

A further object of the invention is the provision of a new and improved braking system of the above described type and comprising: a first check valve in the vacuum supply line to the trailer's vacuum supply reservoir preventing pressure inflow to said reservoir from the supply line, a separate auxiliary reservoir connecting with the trailer vacuum supply line, a second check valve in the connection between the auxiliary reservoir and the supply line for preventing pressure inflow to the reservoir, and means communicating the auxiliary reservoir with the trailer vacuum supply line each time the tractor's brake pedal is actuated, thereby providing sufficient pressure differential for the trailer control motor during brake applying periods to permit a complete brake application if desired, and at the same time providing complete release of the trailer's brakes after each brake application.

The invention resides in certain constructions, and combinations and arrangements of parts, and further objects and advantages will be apparent to those skilled in the art to which the invention relates from the following description of the preferred embodiment described with reference to the accompanying drawings forming a part of this specification, and in which.

Figure 1:
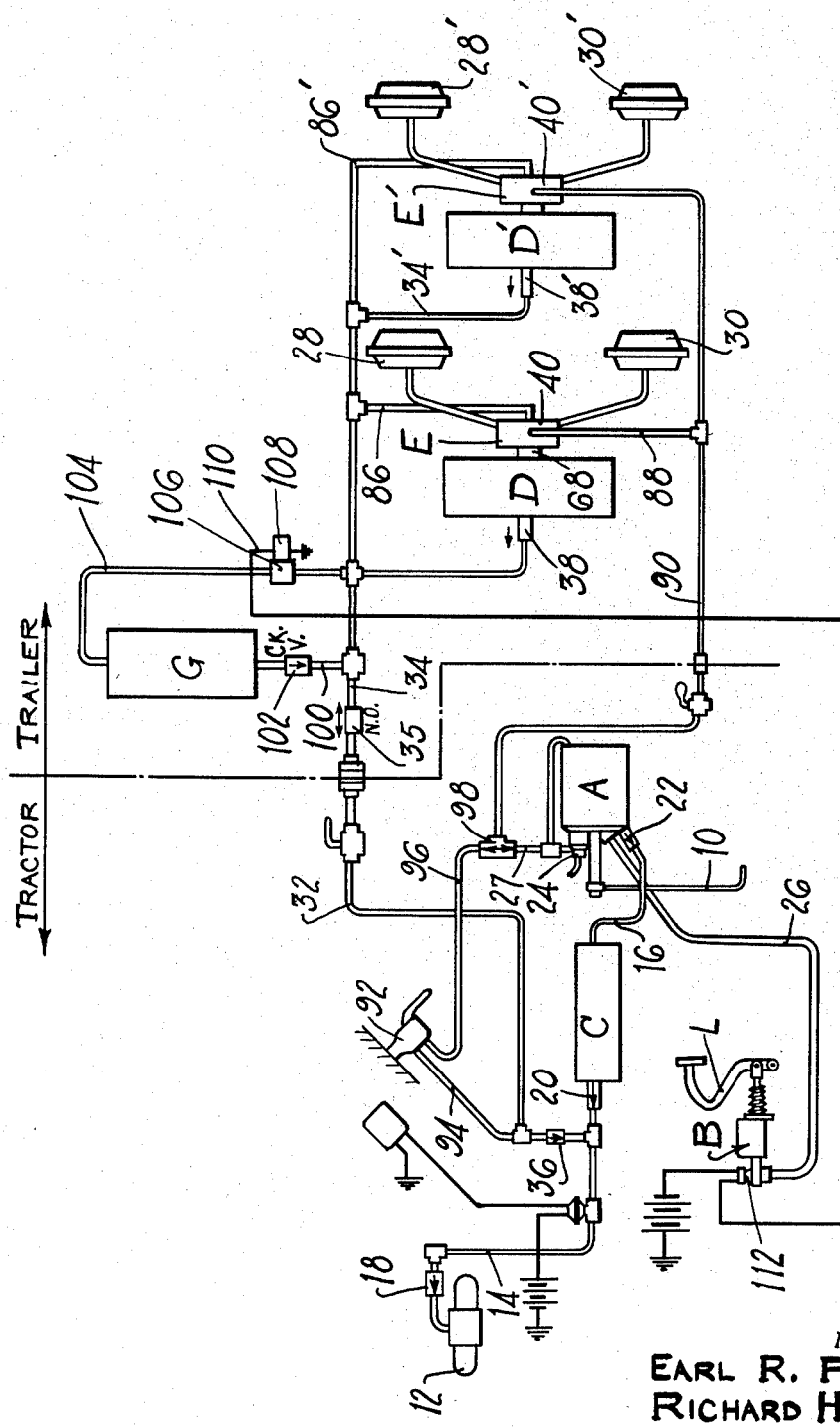
Figure 1 is a schematic diagram of a vacuum over hydraulic braking system for a tractor-trailer combination vehicle and incorporating principles of the present invention.

The braking system shown in Figure 1 generally comprises a vacuum powered fluid pressure servo-motor A of well known construction adapted to normally intensify the hydraulic output pressure from a foot pedal lever operated master cylinder B located on the tractor portion of the vehicle. Hydraulic output pressure from the servo-motor A is communicated by means of line 10 to the brake applying wheel cylinders (not shown) of the tractor.

Vacuum for actuating the servo-motor A is obtained from the manifold 12 of the tractor's engine. The vacuum from the manifold is communicated to a reservoir C adapted to smooth out pulsations in the system through line 14, and thence to the servo-motor A through line 16. A check valve 18 is provided at the manifold to prevent pressure inflow to the system during periods of low manifold pressure, and check valves 20 and 22 are provided adjacent the reservoir and servo-motor respectively to prevent leaks in the system from depleting the vacuum supply.

Vacuum supply to the servo-motor A is controlled by a control valve 24 mounted on the servo-motor and adapted to normally communicate vacuum of equal intensity to both sides of its power piston. The control valve 24 receives its control signal from the master cylinder B through line 26 and thereupon admits air into its output or control line 27. Control line 27 communicates with the back side of the servo-motor power piston; and upon the control valve 24 raising the pressure in this line, the servo-motor is actuated to apply the brakes of the tractor.

The braking system shown in the drawings is also adapted to operate brakes positioned on the trailer, and as shown the trailer's brakes consist of a pair of duplicate braking assemblies one for each axle of the trailer. Only one of these assemblies will be described in detail—corresponding parts of the other assembly being designated by like reference numerals characterized further in that a prime mark is affixed thereto. The braking system for each axle of the trailer generally comprises a pair of normally atmospheric submerged fluid pressure motors or dishpans 28 and 30 each being adapted to operate the brakes of one wheel of the axle. The dishpans 28 and 30 are adapted to be actuated by admitting vacuum to their front sides. Vacuum for actuating the dishpans is supplied by a reservoir D mounted adjacent the axle; and which reservoir in turn is suplied with vacuum from the manifold of the tractor's engine through the tractor branch line 32, the trailer supply line 34 and a normally open check valve 35 which separates the two lines. A check valve 36 is positioned in the tractor branch line 32 to prevent leaks in the tractor's vacuum system from entering the trailer supply line, and a check valve 38 is positioned immediately ahead of the reservoir D to prevent leaks in the trailer supply line from entering the reservoir D. Vacuum communication between the reservoir D and the dishpans 28 and 30 is regulated by a control valve E positioned adjacent the trailer's axle and is operated by means of a fluid pressure motor portion 40, which in turn is operated by means of controls positioned on the tractor portion of the vehicle.

The control valve assembly E is provided with a vacuum chamber 44, and control and atmospheric chambers 46 and 48 respectively, which are separated by a movable wall or diaphragm 50. The vacuum chamber 44 opens into the control chamber 46 through a vacuum port 52 that is surrounded by a valve seat 54. The diaphragm 50 is provided with an opening 56 therein positioned opposite the vacuum port 52, and an annular plate 58 is riveted to the diaphragm to provide an atmospheric valve seat 60. A spool shaped poppet member 62 having flanges 64 and 66 in the atmospheric and control chambers 46 and 48 respectively is provided for controlling flow between the chambers. The flange 64 is adapted to abut the atmospheric valve seat 60, and flange 66 is adapted to abut the vacuum valve seat 54 to regulate the passage of air between the chambers. The vacuum chamber 44 is connected to the reservoir D by a short length of pipe 68, and air pressure is continually admitted to the atmospheric valve chamber 48 through opening 70.

Figure 2:
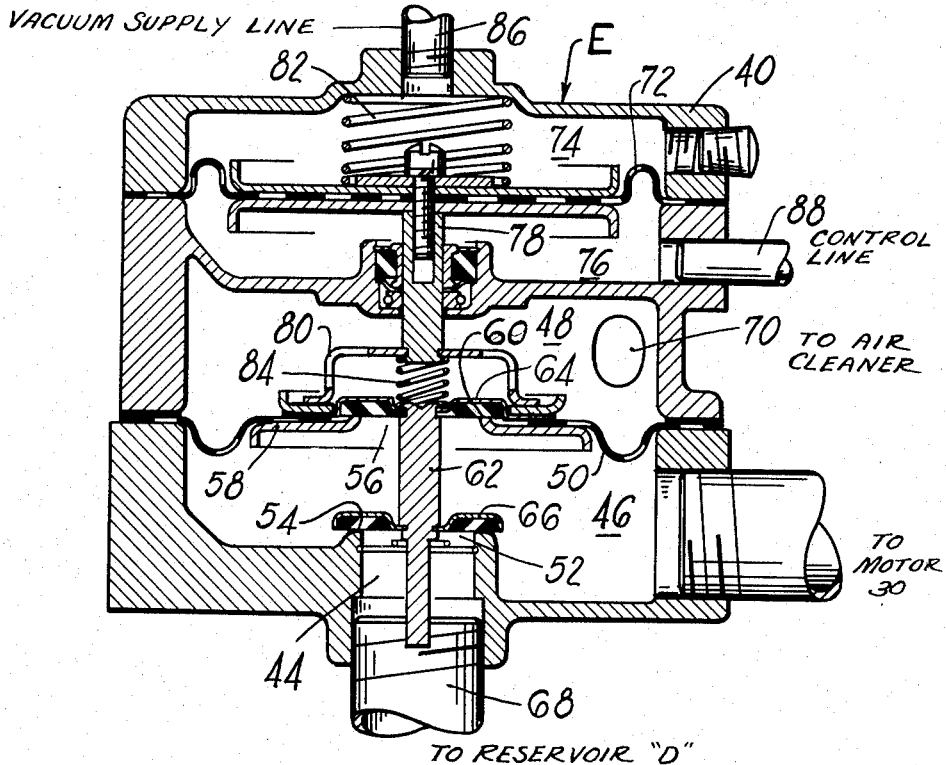
Figure 2 is a cross-sectional view of one of the parts shown in Figure 1.
Figure 3:
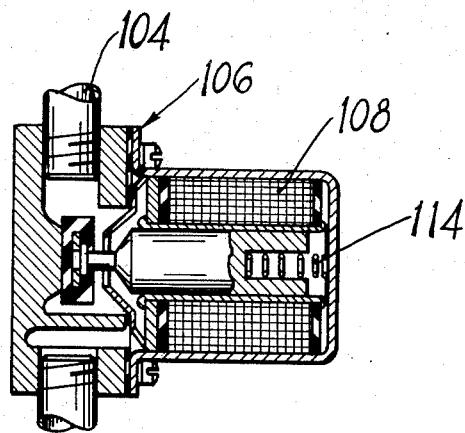
Figure 3 is a cross-sectional view of another of the parts shown in Figure 1.

Movement of the spool shaped poppet member 62 is accomplished by means of the fluid pressure motor portion 40 attached to the valve structure E. The fluid pressure motor portion 40 comprises a movable wall or diaphragm 72 separating a pair of opposed chambers 74 and 76, and rigidly connected to the diaphragm 50 of the control valve E by means of shaft 78 and spider 80. A coil spring 82 biases the movable wall 72 of the motor portion 40 toward the diaphragm 50, and another coil spring 84 positioned between the end of shaft 78 and poppet member 62 biases the poppet member 62 into a position normally closing the vacuum port 52. Spring 82 is strong enough to partially compress spring 84 and hold the atmospheric valve seat 60 formed on plate 58 out of engagement with the top flange 64 of the poppet member 62 to normally provide atmospheric pressure in the control chamber 46. Opposed chamber 74 of the motor is continually submerged with service vacuum from the trailer vacuum supply line 34 through branch line 86, and the other opposed or control chamber 76 of the motor is normally supplied with vacuum of an equal intensity by means of branch line 88 and the trailer control line 90 connecting with the output line 27 of the control valve 24 of the servo-motor A. It will be seen therefore that whenever the servo-motor A is actuated, output pressure from its control valve 24 will be communicated to the control chamber 76 of the control valve structure E. Input pressure built up in the control chamber 76 causes the diaphragm 72 to pull the plate 58 of the control valve E upwardly (as seen in Figure 2) into engagement with the flange 64 of the poppet member 62 thereby closing off atmospheric communication between the atmospheric chamber 48 and the control chamber 46. Additional movement of the diaphragm 72 thereafter lifts the flange 66 of the poppet member 62 out of engagement with the vacuum valve seat 54 to communicate vacuum from the reservoir D with the control chamber 46 of the valve—thereby actuating the brakes of the trailer.

It will be seen that vacuum in the control chamber 46 produces a differential pressure across the diaphragm 50 tending to produce a reactive force opposing the pull of diaphragm 72 causing the vacuum in the control chamber 46 to balance out at an intensity generally proportional to the force exerted by diaphragm 72. A hand control valve 92 mounted in the cab of the tractor is also provided to permit operation of the brakes of the trailer independently of the brakes of the tractor. A vacuum supply line 94 connects the hand control valve with the vacuum branch line 32 on the trailer side of the check valve 36, and the hand control valve output pressure is communicated by means of line 96 to the trailer control line 90. The hand control valve 92 is a normally open valve, as is the control valve 24, such that full service vacuum is normally communicated to the trailer control line 90. Upon operation of the hand control valve 92, a port is opened to the atmosphere to bleed atmospheric pressure into its output line 96 and is thereby supplied to the fluid pressure motor 40 through the transfer valve 98 (of commercial construction) and the trailer control line 90.

The system so far described has the disadvantage in that a slow leak in either of the supply or control lines gradually raises the pressure in both of these lines, thereby depleting the available differential pressure for operating the diaphragm 72.

According to principles of the present invention, auxiliary reservoir G is supplied to resuspend the trailer service vacuum system, each time the brake pedal is operated, thereby assuring that the trailer's brakes can be operated even though slow leaks in the system had previously depleted the vacuum supply communicating with the opposed chamber 74. The auxiliary reservoir G is supplied with vacuum from the trailer supply line 34 through branch line 100 and check valve 102. Vacuum from the reservoir G is communicated with the trailer vacuum supply line 34 each time the brakes of the trailer are applied by means of line 104 and solenoid valve 106. The solenoid valve 106 is held closed during non-braking periods by means of its solenoid 108 which is normally energized by means of the electrical connection 110 and a normally closed pressure switch 112 in the hydraulic output line of the master cylinder B. Upon depressing of the foot pedal lever L, hydraulic pressure from the master cylinder B opens switch 112, whereupon, spring 114 in the solenoid valve 106 causes the valve to open thereby vacuum suspending the supply line 34 and chamber 74 of the control motor 40.

At the same time that the solenoid valve 106 is being actuated by hydraulic pressure from the master cylinder B, control valve 24 for the servo-motor A is also being actuated. Air pressure is thereupon communicated to the remote control chamber 76 through the control line 90 to actuate the remote control valve E. It will be seen that the present system suspends the chamber 74 with the maximum vacuum of which the system is capable of producing each time the brakes are applied, thereby assuring that sufficient pressure differential is available for diaphragm 72 each time the brakes are applied to permit the operator to completely apply his trailer's brakes, even though slow leaks in the system had raised the pressure in the supply line 32 to atmospheric pressure prior to the brake application. Check valve 38 normally maintains reservoir D at an intensity equal to that in reservoir G; and upon application of the trailer's brakes, air from the dishpans 28 and 30 flows to the reservoirs G and D until they are again equalized. It will further be seen that complete release of the trailer's brakes is assured after each brake application inasmuch as the opposing chambers 74 and 76 are communicated to each other by means of the control valve 24 or the hand control valve 92 immediately following each brake application.

In order to provide breakaway protection in the present instance, the normally open check valve 35 is provided in line 32. The check valve 35 is securely attached to the trailer to assure rupture of the line 32 on the tractor side of the valve 35 during trailer breakaway. The check valve 35 is adapted to be closed upon a sudden rush of air into the line 32; and immediately following rupture of line 32, the electrical supply line 110 will be broken to de-energize solenoid 108 and open valve 106. Vacuum from the auxiliary reservoir G will thereby be dumped to chamber 74; and rupture of the control line 90 dumps air into the opposing chamber 76 to completely set the trailer's brakes. The check valve 35 is biased open by a light spring (not shown) such that slow air leakage into the tractor portion of the system will not close the valve. This assures that the chambers 74 and 76 will normally be maintained at equal pressures even though small leaks occur in the system; and further assures a complete application of the trailer's brakes upon trailer breakaway.

Numerous modifications can be made in the above described system. One such modification would be to employ a three way solenoid valve in the trailer supply vacuum line 86 to the service vacuum side of the remote control motor 40. The third port of the three way solenoid valve may be connected directly to an auxiliary reservoir, or to the reservoir D provided check valve 38 is used; and the electrical solenoid of the three way valve may be operated by means of the previously described electrical supply line. With this arrangement, the service vacuum supply line 34 would communicate with the chamber 74 during the energized condition of the solenoid valve; and the auxiliary tank, or reservoir D as the case may be, would be communicated with chamber 74 during the de-energized condition of the solenoid valve. The operation of the system would be substantially the same as above described, and breakaway protection would still be provided.

It will be seen that the objects and advantages heretofore enumerated as well as others have been accomplished and that there has been provided a new and improved tractor-trailer braking system which overcomes the hazards produced by slow leaks in its vacuum supply system. While the preferred embodiment of the invention has been described in considerable detail, I do not wish to be limited to the particular constructions shown or described which may be varied within the scope of the invention, and it is the intention to cover hereby all adaptations, modifications, and arrangements thereof which come within the practice of those skilled in the art to which the invention relates.

We claim:

1. In an automotive braking system utilizing pressure differential between atmosphere and vacuum to control operation of its brakes, and having a brake applying control valve which requires a force to operate that is generally proportional to the intensity of the brake applying output signal produced by the valve: a control fluid pressure motor having a movable wall separating first and second opposed chambers, said movable wall being operatively connected to said control valve to produce an increasing brake applying output signal when moved in the direction of said second chamber, a normally vacuum suspended control line communicating with said first opposed chamber, control means for increasing pressure in said control line when said control means is actuated, a normally vacuum suspended supply line leading to said second opposed chamber, a reservoir communicating with said supply line, a check valve positioned between said supply line and said reservoir permitting said supply line to evacuate said reservoir and normally preventing pressure flow into said reservoir, and solenoid means causing said reservoir to be communicated with said second opposed chamber when said control means is actuated, whereby vacuum from said reservoir can be supplied to said second opposed chamber to assure sufficient pressure differential across said movable wall to substantially completely actuate said brake applying control valve.

2. In an automotive braking system utilizing pressure differential between atmosphere and vacuum to control operation of its brakes, and having a brake applying control valve which requires a force to operate that is generally proportional to the intensity of the brake applying output signal produced by the valve: a control fluid pressure motor having a movable wall separating first and second opposed chambers, said movable wall being operatively connected to said control valve to produce an increasing brake applying output signal when moved in the direction of said second chamber, a normally vacuum suspended control line communicating with said first opposed chamber, a normally vacuum suspended supply line leading to said second opposed chamber, a reservoir communicating with said supply line, a spring loaded check valve positioned between said supply line and said reservoir permitting said supply line to evacuate said reservoir and normally preventing pressure flow into said reservoir, brake pedal lever operated means for increasing pressure in said control line when said brake pedal lever operated means is actuated, solenoid valve means which when energized causes said reservoir to be isolated from said second opposed chamber and which causes said reservoir to be communicated with said second opposed chamber when de-energized, and normally closed electrical switch means normally energizing said solenoid valve means and de-energizing said solenoid means each time said brake pedal lever operated means is actuated, whereby atmospheric leakage into said second opposed chamber during the interim between actuations of said brake pedal lever operated means is removed during each actuation thereof to assure that a complete system actuation can be made.

3. In an automotive braking system having a remotely positioned vacuum actuated brake applying fluid pressure motor: a remotely positioned pneumatic reservoir; a vacuum supply line communicating with said reservoir; check valve means in said supply line to said reservoir preventing pressure flow into said reservoir; a control valve for communicating said reservoir with said brake applying fluid pressure motor, said control valve requiring a force to operate proportional to vacuum intensity supplied said brake applying fluid pressure motor by said control valve; a normally vacuum suspended control fluid pressure motor having a movable wall separating first and second opposed chambers, said movable wall being operatively connected to said control valve to admit vacuum to said brake applying fluid pressure motor when moved in the direction of said second chamber; a normally vacuum suspended control line communicating with said first opposed chamber; control means for maintaining said supply and control lines at substantially equal vacuum intensities during non-actuating periods of said brake applying fluid pressure motor, and to admit air to said control line when actuated; an auxiliary vacuum reservoir means normally communicating with said supply line to said second opposed chamber; and means communicating said auxiliary reservoir with said second opposed chamber when said control means is actuated; whereby complete release of said brake applying fluid pressure motor is assured during non-braking conditions of the system, and sufficient pressure differential is provided for operating said normally vacuum suspended control fluid pressure motor during braking periods to make possible a complete actuation of said brake applying fluid pressure motor.

4. In an automotive braking system having a remotely positioned vacuum actuated brake applying fluid pressure motor: a remotely positioned pneumatic reservoir; a vacuum supply line communicating with said reservoir; check valve means in said supply line to said reservoir preventing pressure flow into said reservoir; a control valve for communicating said reservoir with said brake applying fluid pressure motor, said control valve requiring a force to operate proportional to vacuum intensity supplied said brake applying fluid pressure motor by said control valve; a normally vacuum suspended control fluid pressure motor having a movable wall separating first and second opposed chambers, said movable wall being operatively connected to said control valve to admit vacuum to said brake applying fluid pressure motor when moved in the direction of said second chamber; a normally vacuum suspended control line communicating with said first opposed chamber; control means for maintaining said supply and control lines at substantially equal vacuum intensities during non-actuating periods of said brake applying fluid pressure motor, and to admit air to said control line when actuated; an auxiliary reservoir communicating with said supply line; a spring loaded check valve positioned between said supply line and said auxiliary reservoir permitting said supply line to evacuate said reservoir and normally preventing pressure back flow into said reservoir; solenoid valve means for communicating said auxiliary reservoir with said service line when de-energized but closing off communication therebetween when energized; and normally closed electrical switch means normally energizing said solenoid valve means but de-energizing said solenoid each time said control means is actuated.

References Cited in the file of this patent
UNITED STATES PATENTS

| | | |
|---|---|---|
| 2,571,885 | Ingres | Oct. 16, 1951 |
| 2,582,612 | Williams | Jan. 15, 1952 |
| 2,656,014 | Fites | Oct. 20, 1953 |
| 2,675,099 | Troy | Apr. 13, 1954 |

UNITED STATES PATENT OFFICE
CERTIFICATE OF CORRECTION

Patent No. 2,910,325                      October 27, 1959

Earl R. Price et al.

It is hereby certified that error appears in the printed specification of the above numbered patent requiring correction and that the said Letters Patent should read as corrected below.

Column 6, line 75, for "for maintaining" read -- adapted to maintain --.

Signed and sealed this 6th day of September 1960.

(SEAL)

Attest:

ERNEST W. SWIDER
Attesting Officer

ROBERT C. WATSON
Commissioner of Patents